Nov. 15, 1949 J. BOWMAN 2,488,164
METHOD OF PROCESSING MEAT PRODUCTS
Filed March 2, 1946 2 Sheets-Sheet 1
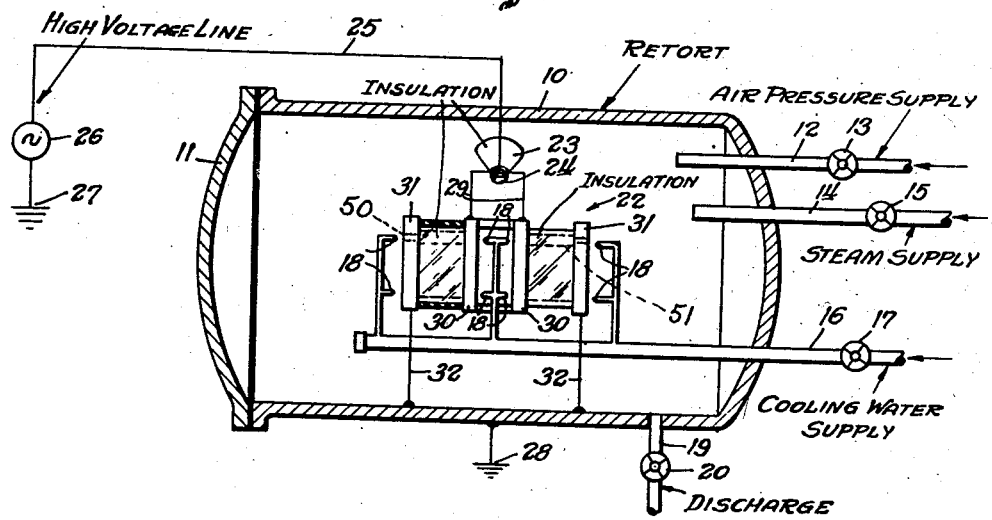
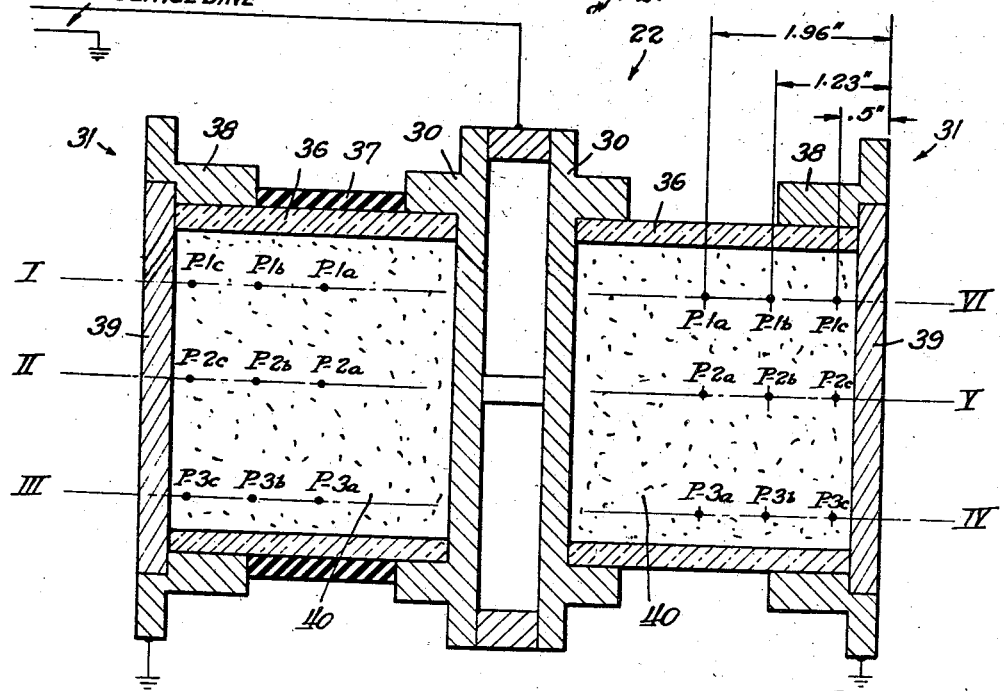
Inventor:
Jay Bowman

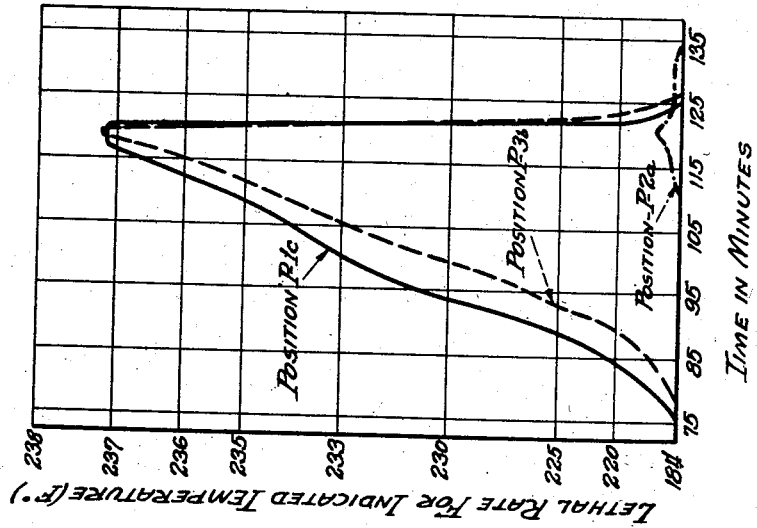
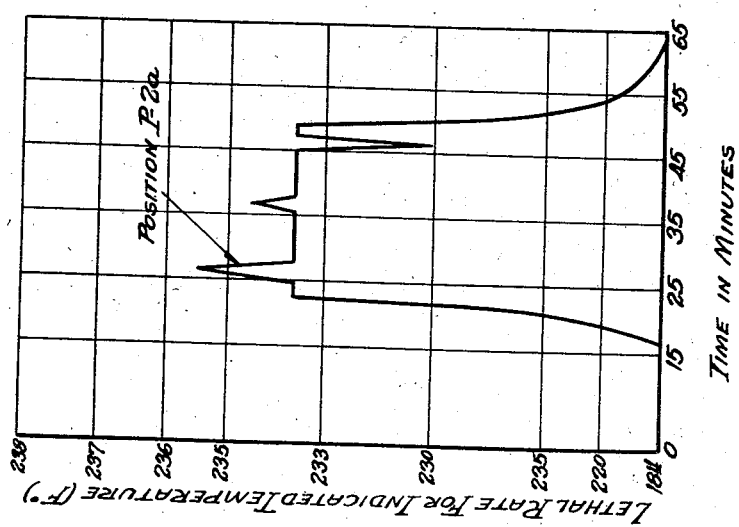

Patented Nov. 15, 1949

2,488,164

UNITED STATES PATENT OFFICE 2,488,164

METHOD OF PROCESSING MEAT PRODUCTS

Jay Bowman, Chicago, Ill., assignor to A. W. Brickman, Victor Conquest, Frank J. Madden, Wrisley B. Oleson, and Emery T. Filbey, as trustees for the American Meat Institute Foundation, Chicago, Ill., a corporation of Illinois Application March 2, 1946, Serial No. 651,569

3 Claims. (Cl. 99—107)

This invention relates to the processing of meat and it has particular relation to the cooking or processing thereof in connection with packaging the same in sealed containers adapted to be stored for indefinite periods of time.

In the processing of meat in sealed containers there has heretofore been the problem of obtaining a substantially uniform cooking effect and sterilization value throughout the mass. When meat is processed in the can according to conventional methods, the application of heat is not uniform throughout the mass. Steam cooking or processing subjects the outer portions of the mass to greater treatment than is applied to the central portion. This is because heat applied at the outside must travel through the outer layers to reach the center of the mass. The necessary temperature gradient to produce rapid travel of the heat tends to result in over-treatment of the outer portions particularly if the processing is to be done expeditiously.

I have conceived the possibility of generating heat internally, i. e., in the mass to be processed, and of subsequently applying heat from the outside. By balancing the actions of the two heat sources and applications of heat including the effect of sequent cooling processes, the temperature gradients which tend to be established by the aforesaid two sources may be made substantially to equalize their effects, and thus produce a heat treatment which is substantially uniform or sufficiently approaching uniformity as to overcome the deficiencies in previous methods of processing.

The chief object of the invention is the producing of a novel type of canned product in which all portions receive substantially equal heat treatment.

It is a further object of the invention to apply heat at adequate temperatures and in adequate quantity either successively or simultaneously, both internally and externally of the mass to be treated, whereby it receives the same heating or sterilizing treatment throughout without over cooking portions of the same.

In the processing of luncheon meat, hams and similar products, the matter of securing adequate sterilizing treatment throughout, while at the same time minimizing loss of nutritive values, vitamin content and other qualities, particularly taste, has presented an unsolved problem.

The method of the present invention may in one embodiment of the invention be carried out by the following successive steps.

1. Forming the mass to be treated into predetermined shapes and dimensions.
2. High frequency heating of the mass, which tends to produce approximately uniform heating throughout, but which by loss of heat at the outer surfaces tends to result in a higher temperature in the central portions.
3. Cooling of the mass to the center temperature desired. Since the heat is extracted through the outer surfaces, the center remains hot longer than the outside, and the center relative to the outside tends to be overprocessed. Water cooling on the outside is contemplated.
4. The preformed mass is then vacuum packed in a sealed can.
5. Steam processing under usual retort conditions which tends to overprocess the outer portion of the contents of the can.
6. Cooling of the can and contents, as by water spray upon the outside, or immersion in water.

Experiments have demonstrated the satisfactory operability of the aforesaid procedure, and the application of mechanical methods and equipment for coordinating the steps into a commercial routine, may be performed by those skilled in the art.

The development of heat internally of the mass to be treated may be brought about by the use of high frequency current by electrodes applied to opposite faces of a prepared or preformed block of meat. The meat while undergoing the treatment is preferably contained in a suitable vessel to maintain form, and under suitable pressure to retain liquids, i. e., to prevent boiling off of liquids or causing them to separate from the mass of meat, and to avoid air spaces in the meat which tend to permit drying, resulting in burning of the meat and giving it an undesirable flavor.

The subsequent step of vacuum packing in a can and processing with externally applied steam heat is performed with the same conditions imposed, i. e., adequate maintenance of fluid pressure on the block of meat during the period that heat is applied at a temperature above the normal boiling point of water. In this case, the internal pressure developed in the can serves the desired function of maintaining the meat under the desired pressure. That is a known feature of prior methods of processing canned meats. Each treatment is terminated and controlled by external cooling and consequent or independently controlled reduction of pressure.

It is believed that the concept of coordinating usefully, internal development of heat and sequent cooling, and externally applied heat and sequent cooling, under suitably controlled conditions to secure approximately uniform heat treatment throughout the mass is broadly new.

Now in order to acquaint those skilled in the art to which the invention pertains how to practice the present invention, there is described herein, in connection with the accompanying drawings, a specific embodiment of the same.

In the drawings:

Figure 1 is a longitudinal sectional view of a retort showing how one particular applicator was positioned therein for performing certain tests in accordance with the present invention, with respect to certain features the showing in this figure is diagrammatic;

Figure 2 is a longitudinal horizontal sectional view through the applicator, illustrating diagrammatically the electrical connections thereto and showing various positions at which temperature measurements were made; and Figures 3 and 4 show curves which demonstrate the manner in which the temperature changed with respect to time at different locations in the meat using different sources of heat to produce the temperatures there indicated.

Referring now particularly to Figure 1 of the drawings it will be noted that the reference character 10 designates the standard retort such as would be used for conventional steam operations. It will be understood that it is provided with suitable openings (not shown) closed by transparent windows to permit observation of the interior and particularly for the purpose of making temperature measurements. The retort 10 is generally cylindrical in form and is provided with a cover 11 which may be secured in place by suitable clamp means (not shown).

The retort 10 may also be provided with manual or automatic controls for supplies of steam, air and water. The air pressure supply is indicated at 12 as being a suitable conduit having a control valve 13 therein. Likewise the steam supply may be provided through a conduit 14 having a control valve 15. The cooling water may be supplied through a conduit 16 controlled by valve 17. Nozzles 18 are supplied from the conduit 16 with cooling water for a purpose which will be set forth hereinafter. A discharge conduit 19 is provided at the bottom of the retort 10 and has a control valve 20 therein.

The meat to be processed is placed in an applicator, which is indicated generally at 22. Suitable means are provided in the retort 10 for mounting the applicator 22 substantially centrally thereof in a horizontal position. Since the support means is conventional and forms no part of the present invention, illustration of the same is omitted for the sake of clarity.

In order to permit introduction of the high frequency current inside of the retort 10, there is provided in one wall thereof an insulator 23 through which a terminal 24 extends. The terminal 24 is connected by a conductor 25 which, as indicated, forms a high voltage line that may be energized from a high frequency alternating current source 26. For purposes of illustration it is indicated that the source 26 may be of 15 kw. capacity and arranged to generate a frequency of 10 megacycles. It will be understood, however, that other capacities and other frequencies can be employed without departing from the spirit and scope of this invention.

One terminal of the source 26 is grounded as illustrated at 27. Likewise, the retort is grounded as indicated at 28. The conductors 29 serve to interconnect the terminal 24 with intermediate plates 30 of applicator 22. End plates 31 of the applicator 22 are connected to ground over conductors 32, as shown.

The details of construction of the applicator 22 here under consideration are more clearly shown in Figure 2 of the drawings. It will be observed that it is generally made up of two parts, each part comprising end plates 30 and 31 and a cylindrical vessel 36 therebetween preferably of high temperature resistant glass, such as "Pyrex" glass. If desired an insulating ring of sheet rubber 37 can be applied around the vessel 36, as shown, and between the flanges of the end plates 30 and 31 extending toward each other. It will be noted further that each of the end plates 31 is made up of a ring 38 and a closure plate 39. It will be understood that suitable clamp means are provided for holding the end plates 30 and 31 in position at the ends of the vessel 36 for containing therein and therebetween meat 40 which is to be processed in accordance with the present invention.

It will be observed that, in effect, the plates 30 and 31, together with the intervening insulating medium, provide a capacitor construction. By placing these capacitors, end to end as shown, it is possible to apply the high voltage to the intermediate plates 30 while the end plates 31 are grounded. Since the end plates 31 are grounded, they may be mounted in the retort 10 conductively with respect thereto. This facilitates mounting of the applicator 22 as will readily be understood.

In order to determine the degree of cooking or processing of the meat 40 at various points therein, the temperatures therein at different points along lines I through VI were measured at points P—1a, etc., and the results were tabulated. It is sufficient for present purposes to indicate merely the temperatures at points 1c, 2a and 3b. These temperatures are plotted on the curves shown in Figures 3 and 4 of the drawings.

The primary object of the present invention is to balance the heating and cooling phases of the high frequency and steam cooks or processing, as to any particular points, so as to obtain substantially equal sterilizing values (Fz) at every point. In this particular operation here under consideration pork luncheon meat in raw condition was taken from a 12 oz. vacuum-filled can obtained from a packing house just before conventional steam processing. A series of cylinders was cut from the block of meat pushed out from the 12 oz. can. The empty space between two such cylinders was filled in by additional material molded to the size necessary to give a tightly filled can. This meat is indicated at 40 in Figure 2 of the drawings. A headspace is left between the top of each block of meat and its respective container 36. This space is indicated in Figure 1 as being above the broken line 51. The end plates 30 and 31 were then closed and thermometers were inserted in one of the vessels while thermocouples were inserted in the other.

The processing of the meat was accomplished first by the application of high frequency current between the plates 30 and 31. In this particular instance a current of .15 ampere at a voltage of 4200 volts was used for the first 22 min. Thereafter the high frequency was applied intermittently during 15 sec. out of each minute for the purpose of holding the temperature at the central point 2a substantially constant. It will be observed that relatively low power was employed. The purpose of this was to provide a low rate of temperature rise so that air in the meat 40 would have an opportunity to escape through apertures 50 left in the end plates 30 and 31, and to avoid building up large internal pressures due to subsequent heating of the air. At the same time air pressure was applied, gradually rising to 20 lbs. per square inch for the purpose of retaining the liquids in the vessels. As indicated, the end plates 30 and 31 have breathing openings 50 near the top as shown in Figure 1. Any liquid which is driven out of the meat due to the heating does not run out but lies between the two heads or electrodes formed by the end plates 30 and 31. The expansion and contraction of the meat under treatment thus has less disturbing effect than if the applicator 22 were disposed vertically.

After maintaining the high frequency current on for an appreciable period, it was shut off and cooling water was applied through the nozzles 18. It will be observed that the nozzles 18 are arranged to play on the end plates 30 and 31. The arrangement is such that the temperature can be rapidly reduced by the application of sufficient water. During the application of the water the air pressure was continued so as to provide the necessary external pressure on the applicator 22.

When the temperatue was reduced to 203° F. at the point 2a, then the cooling water was turned off and steam was applied. The steam processing was maintained until the total length of time of processing at or above 234° F. for the outside 1c was equal to the period at this same temperature for the central point 2a during the high frequency treatment. The steam was then shut off and air pressure and cold cooling water again applied, as previously described.

The data obtained during the application of high frequency and steam are set forth in the following table.

High frequency operation

| Time, Minutes | Standard Positions | | | Pressure P. S. I. G. (Air) |
|---|---|---|---|---|
| | 1c, °F. | 2a, °F. | 3b, °F. | |
| 0 HF Power on—4200 volts, 0.15 ampere—measured at generator | | | | |
| 11 | 113 | | | |
| 13 | 122 | | | 3 |
| 14 | 127 | | 133 | 3 |
| 15 | 135 | | 140 | 3 |
| 17 | 142 | | 147 | 3 |
| 18 | 147 | | 151 | 4 |
| 19 | | | 158 | 10 |
| 20 | 153 | 201 | 165 | 15 |
| 21 | 158 | 207 | 167 | 15 |
| 22 | 165 | 221 | 176 | 15 |
| 23 Power continued intermittently, 15 sec. out of each minute to time 50 | 165 | 223 | 176 | 20 |

| Time, Minutes | Standard Positions | | | Pressure P. S. I. G. (Air) |
|---|---|---|---|---|
| | 1c, °F. | 2a, °F. | 3b, °F. | |
| 24 | 167 | 234 | 183 | 20 |
| 25 | 167 | 234 | 180 | 20 |
| 26 | 165 | 234 | 178 | 20 |
| 28 | 165 | 235 | 176 | 20 |
| 30 | 163 | 234 | 171 | 20 |
| 32 | 162 | 234 | 169 | 20 |
| 34 | 162 | 234 | 167 | 20 |
| 36 | 162 | 234 | 167 | 20 |
| 38 | 162 | 235 | 167 | 20 |
| 40 | 162 | 234 | 165 | 20 |
| 42 | 162 | 234 | 165 | 20 |
| 44 | 162 | 234 | 167 | 20 |
| 48 | 163 | 230 | 165 | 20 |
| 50 HF off | 162 | 234 | 165 | 20 |
| 52 cooling | 156 | 228 | 162 | 20 |
| 54 water on | 149 | 221 | 158 | 20 |
| 56 | 140 | 216 | 151 | 20 |
| 58 | 129 | 212 | 144 | 20 |
| 60 | 122 | 207 | 135 | 10 |
| 62 | | 203 | 129 | 7 |

*Steam process*

| Time, Minutes | Standard Positions | | | Retort Pressure P. S. I. G. (Steam) |
|---|---|---|---|---|
| | 1c, °F. | 2a, °F. | 3b, °F. | |
| 68 Steam on | | | | |
| 72 | 162 | | 122 | 8 |
| 74 | 174 | | 160 | 9 |
| 76 | 185 | | 176 | 9 |
| 79 Steam up | 205 | | 194 | 10 |
| 80 | 210 | | 199 | 10 |
| 82 | 216 | | 207 | 10 |
| 84 | 217 | | 214 | 10 |
| 86 | 223 | | 217 | 10 |
| 88 | 223 | | 221 | 10 |
| 90 | 226 | | 221 | 10 |
| 92 | 228 | | 225 | 10 |
| 94 | 228 | | 226 | 10 |
| 96 | 232 | | 228 | 10 |
| 97 | 232 | | 230 | 10 |
| 99 | 234 | | 230 | 10 |
| 100 | 234 | | 230 | 10 |
| 102 | 234 | | 230 | 10 |
| 104 | 234 | | 232 | 10 |
| 106 | 234 | | 234 | 10 |
| 108 | 235 | | 234 | 10 |
| 110 | 235 | | 235 | 10 |
| 112 | 235 | | 235 | 10 |
| 114 | 236 | | 236 | 10 |
| 116 | 236 | 208 | 236 | 10 |
| 118 | 237 | 210 | 236 | 10 |
| 119 Steam off, air pressure on, cooling water on | | | | |
| 120 | 237 | 212 | 237 | 10 |
| 121 | 235 | 212 | 234 | 10 |
| 123 | 216 | 208 | 226 | 10 |
| 125 | 190 | 203 | 208 | 10 |
| 130 | 167 | 203 | 208 | 10 |
| | 126 | 203 | 149 | Retort opened |

In Figures 3 and 4 are shown the lethality curves which were plotted from the temperature data set forth in the foregoing table. From these curves it is possible to obtain the equivalent sterilization value ($F_z$) by calculating the area under each curve.

It will be noted that the curve, shown in Figure 3, shows the temperature at the point 2a at various times during the high frequency treatment. This point is located at the center of the meat being processed and the curve clearly shows that the high frequency is effective in raising the temperature of the meat in this general location. The absence of curves corresponding to points 1c and 3b indicates that the temperatures to which they were raised were not sufficient to show the graph thereof within the region plotted in Figure 3. This will be evidenced from a consideration of the data in the foregoing table for the first 62 min. of the test.

In Figure 4 are curves shown for the temperatures at the points 1c, 2a and 3b during the steam process. The points 1c and 3b, it will be recalled, are located near the outside of the vessel 36 while the point 2a is at the center thereof. While the temperatures of the points 1c and 3b were elevated substantially during the time that steam was applied, it will be noted that the temperature of the central point 2a did not rise nearly so high.

The following table gives data on the sterilizing values ($F_z$) at the three temperature positions, 1c, 3b and 2a. It will be noted that the values are fairly uniform, with the value for the center position 2a being intermediate between the values for the outer positions 1c and 3b.

Sterilizing values ($F_z$) at thermometer positions

|  | 1c (Outer) | 3b (Outer) | 2a (Center) |
|---|---|---|---|
| High Frequency process. | Negligible | Negligible | 3.80 |
| Steam process | 4.30 | 3.60 | ¹ 0.10 |
| Combined effect | 4.30 | 3.60 | 3.90 |

¹ This value of 0.10 represents the $F_z$ value at the center with steam processing alone. Note that the $F_z$ value at the outer position 1c for the steam processing is forty-three times the $F_z$ value at the center position, 2a.

The foregoing data clearly show that by applying combinations of high frequency treatment and steam treatment, including their respective cooling processes, it is possible to approximately uniformly cook or process the block of meat 40. This is done without overheating any part thereof. Thus by properly balancing the time and extent of high frequency and steam processing, with their associated cooling processes it is possible to arrive at preferred relationships for given quantities of meat which will permit rapid, satisfactory and economical processing or cooking thereof.

While the invention has been described as first employing the high frequency heating for processing the central portion of the meat 40, and subsequently applying steam heat for processing the outside, it will be understood that this sequence of the application of heat from different sources can be reversed. What is desired is that the processing at the center be approximately the same as the processing near the walls of the vessel, thereby providing a fairly uniform process or heat treatment throughout the entire block or mass of meat.

The meat 40 may be removed from the applicator 22 after the central portion has been electrically cooked or processed and placed in cans, either entirely of metal or having glass bodies with metallic end caps, where it is vacuum packed. Thereafter the cans are subjected to external heat, such as applied by steam, and pressure, such as applied by compressed air, sufficiently to cook or process the outer portions of the meat. The resulting canned meat product is approximately uniformly processed throughout.

Obviously certain changes can be made in the construction and method disclosed herein. Accordingly, it is intended that all matter shown in the accompanying drawings and described hereinbefore shall be interpreted as illustrative and not in a limiting sense.

I claim as my invention.

1. Method of processing meat which comprises forming the mass to be treated in a block, confining the block of meat in a container opposite walls of which are electrically conductive and the lateral walls of which are substantially electrically non-conductive, passing high frequency current through said block by way of said conductive walls to raise the central part of the block to processing temperature, applying external fluid pressure to the container to oppose internal pressure generated by the heat developed in the mass, maintaining for a predetermined time the inner portion of the mass at temperatures high enough to effect processing of said inner portion, cooling the container, subjecting the container to steam, to process the outer portions of the block, and then cooling the container, the amount of processing of said inner portions including that occurring during the cooling thereof, and the amount of processing of said outer portions including that occurring during the cooling thereof, being sufficient to uniformly process said block throughout.

2. Method of processing meat which comprises forming the mass to be treated in a block, confining the block of meat in a container opposite walls of which are electrically conductive and the lateral walls of which are substantially electrically non-conductive, passing current through said block by way of said conductive walls to raise the central part of the block to processing temperatures, applying external fluid pressure to the container to oppose internal pressure generated by the heat developed in the mass, maintaining for a predetermined time the inner portions of the mass at temperatures high enough to effect the principal part of the processing of said inner portions, cooling the container, sealing the block in a can, subjecting the sealed can to steam at processing temperatures to effect the principal part of the processing of the outer portions of the block, and then cooling the can, the respective total amounts of processing at each point of said inner and outer portions, including that occurring during the cooling thereof, being sufficient to process said block substantially uniformly throughout.

3. Method of processing meat which comprises, disposing a mass of meat to be treated in a container the lateral surfaces of which are substantially electrically non-conductive and the ends of which form conductor electrodes, passing high frequency current through the mass by way of the electrodes to develop processing heat throughout the central part of the mass and simultaneously therewith applying external fluid pressure to the container sufficient to oppose internal pressure generated by the heat developed in the mass, sealing the mass in a can, and subjecting the can to external heating sufficient to process the outer part of the mass whereby the meat is processed throughout approximately uniformly.

JAY BOWMAN.

REFERENCES CITED

The following references are of record in the file of this patent:

UNITED STATES PATENTS

| Number | Name | Date |
|---|---|---|
| 1,900,573 | McArthur | Mar. 7, 1933 |
| 1,961,681 | Bohart | June 5, 1934 |
| 2,054,756 | Kremer | Sept. 15, 1936 |
| 2,305,480 | Kamarik | Dec. 15, 1942 |
| 2,387,221 | Williams et al. | Oct. 16, 1945 |
| 2,398,082 | Cavallito | Apr. 9, 1946 |

FOREIGN PATENTS

| Number | Country | Date |
|---|---|---|
| 25,159 | Great Britain | Accep. Apr. 8, 1909 |